United States Patent Office 3,184,481
Patented May 18, 1965

---

3,184,481
2-ALKOXY-5,5-BIS(HALOALKYL)-2,5-DIHYDRO-FURANS AND PREPARATION THEREOF
Horace R. Davis, Roseville, Minn., assignor to Minnesota Mining and Manufacturing Company, St. Paul, Minn., a corporation of Delaware
No Drawing. Filed Feb. 16, 1962, Ser. No. 173,809
3 Claims. (Cl. 260—347.8)

This invention relates to new and useful 2-alkoxy-5,5-bis(haloalkyl)-2,5-dihydrofurans, to intermediate therefor and to methods for making the same.

It is an object of this invention to provide novel dihydrofurans. A further object of this invention is to provide bactericides. Other objects of the invention will become apparent from the disclosure hereinafter.

In accordance with these and other objects of the invention, I have found that when a propargyllic hydrogen is present as part of a propargyl ether reaction with halogenated ketones takes an unexpected course and 2-alkoxy-5,5-bis(haloalkyl)-2,5-dihydrofurans are obtained.

The ketone employed has the general formula:

wherein A and B are each the same or different perhaloalkyl group of 1 to 6 atoms fully substituted by halogen atoms selected from the group consisting of fluorine and chlorine, at least one of said halogen atom on the α-carbon atoms being fluorine.

The propargyllic ethers useful in the process of the invention are of the formula:

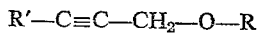

wherein R is selected from the group consisting of alkyl radicals of 1 to 8 carbon atoms and R' is a member of the group consisting of hydrogen and lower alkyl radicals.

The reaction is effected by interreaction at temperatures of 0° to 180° C. under autogenous pressure as described by the equation:

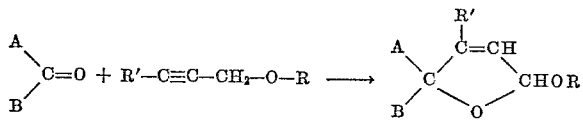

wherein A, B, R and R' have the above significance. The products are generically described as 5,5-bis(haloalkyl)-2-alkoxy-2,5-dihydrofurans. They are characterized by the infrared absorption and nuclear magnetic resonance spectra showing a double bond with one proton attached to each carbon atom (—CH=CH—), a CH group attached to O, alkoxyl groups and a complete absence of carbonyl, hydroxyl and C≡C groups.

No catalyst, diluent or other addition is necessary for the reaction which occurs on simple heating. The more complicated the structures of R and particularly R', the higher the temperature of heating.

The dihydrofurans of the invention are cleaved by dilute acid to give γ-hydroxy-α-β-unsaturated aldehydes. These aldehydes are further characterized by their elemental composition and by their ability to react with potassium permanganate. The aldehydic compounds are useful as bactericides, for example, against *Bacillus subtilis*.

Illustrative of the fluorinated ketones which are useful are bis-perfluoropropyl ketone, hexafluoroacetone, bis-(chlorodifluoromethyl) ketone, bis-(fluorodichloromethyl) ketone, chlorodifluoromethyl fluorodichloromethyl ketone and the like.

Suitable propargyllic esters are: methyl propargyl ether, propyl propargyl ether, amyl propargyl ether, ethyl propargyl ether, octyl propargyl ether, methyl 1-but-2-ynyl ether, and the like.

The term lower alkyl radicals is to be understood as referring to alkyl radicals having from 1 through 6 carbon atoms.

Having thus described the reaction generally it is now more particularly illustrated by examples showing the best mode presently contemplated of practicing the invention. Herein parts are by weight, temperatures in degrees centigrade and pressures in mm. of Hg.

*Example 1*

A mixture of 12.4 parts of 1,3-dichloro-1,1,3,3-tetrafluoropropanone and 5.1 parts of methyl propargyl ether is heated under autogenous pressure at 140° C. for 18 hours and then distilled under reduced pressure. The fraction distilling at 71° C. at 11 mm. of mercury pressure had a refractive index $n_D^{20}$ 1.4124. Elemental analysis confirms that the product is a 1:1 molar reaction product of the two starting materials.

Calculated for $C_7H_8Cl_2F_4O_2$: 31.2% C; 28.2% F. Found: 31.2% C; 28.2% F.

The infrared spectrum of this material shows that no hydroxy or carbonyl groups are present. There is a band for a carbon-carbon double bond at 6.1 microns. The nuclear magnetic resonance spectrum shows two protons in the double bond, each on separate carbon atoms, a CH group attached to an oxygen atom and a methoxyl group. These data support the structure 2-methoxy-5,5-bis(chlorodifluoromethyl)-2,5-dihydrofuran. This compound is found to be toxic to fish and to possess bactericidal activity. As a bactericide, it is dispersed in water and applied for example to a surface, or to glassware, for disinfecting purposes.

Action of dilute mineral acid such as 2 N hydrochloric acid at 100° for 24–48 hours converts this material to the aldehyde,

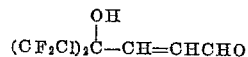

which is characterized by its infrared and nuclear magnetic resonance spectra, by its elemental analysis and by reaction with fuchsin and Tollen's reagents. Small amounts of this aldehyde are also isolated by vapor phase chromatography of the original reaction mixture or the distillation residue. It is 4,4-bis(chlorodifluoromethyl)-buten-2-ol-4-al-1.

Calculated for $C_6H_4Cl_2F_4O_2$: 28.2% C; 29.8% F. Found: 28.8% C; 29.6% F.

*Example 2*

A mixture of 83 parts of hexafluoroacetone and 42 parts of ethyl propargyl ether is heated for 18 hours to 100° C. under autogenous pressure. The product recovered by distillation of the reaction mixture is identified as 2-ethoxy-5,5-bis(trifluoromethyl)-2,5-dihydrofuran.

*Example 3*

A mixture of 43 parts of 1,1,3-trifluoro-1,3,3-trichloropropanone and 14 parts of methyl propargyl ether is heated for 64 hours to 160° C. under autogenous pressure. The product recovered by distillation of the reaction mixture is identified as 2-methoxy-5-chlorodifluoromethyl-5-dichlorofluoromethyl-2,5-dihydrofuran.

*Example 4*

A mixture of 37 parts of perfluoroheptanone-4 and 13 parts of hexyl propargyl ether is heated for 64 hours at 180° C. under autogenous pressure. The product recovered by distillation of the reaction mixture is identified as 2-hexyloxy-5,5-bis(heptafluoro-n-propyl)-2,5-dihydrofuran.

*Example 5*

A mixture of 17 parts of hexafluoroacetone and 16 parts of octyl propargyl ether is heated for 18 hours to 100° C. under autogenous pressure. The product recovered by distillation of the reaction mixture is identified as 2-octyloxy-5,5-bis(trifluoromethyl)-2,5-dihydrofuran.

*Example 6*

A mixture of 20 parts of 1,3-dichloro-tetrafluoroacetone and 9 parts of methyl but-2-yn-1-yl ether is heated for 36 hours to 140° C. under autogenous pressure. The product recovered by distillation of the reaction mixture is identified as 2-methoxy-5,5-bis(chlorodifluoromethyl)-4-methyl-2,5-dihydrofuran.

What is claimed is:
1. A compound of the formula:

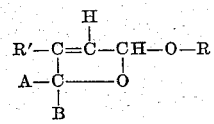

wherein each of A and B is a perhaloalkyl group of 1 to 6 carbon atoms fully substituted by halogen atoms selected from the group consisting of fluorine and chlorine, at least one of said halogen atoms on the α-carbon atoms being fluorine; R is alkyl of 1 to 8 carbon atoms and R' is selected from the group consisting of hydrogen and lower alkyl.

2. The process for the production of a 2-alkoxy-2,5-dihydrofuran of the formula:

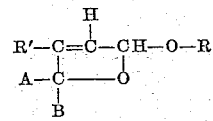

wherein each of A and B is a perhaloalkyl group of 1 to 6 carbon atoms fully substituted by halogen atoms selected from the group consisting of fluorine and chlorine, at least one of said halogen atoms on the α-carbon atoms being fluorine; R is alkyl of 1 to 8 carbon atoms and R' is selected from the group consisting of hydrogen and lower alkyl; which comprises interreacting: (I) a bisperhaloalkyl ketone and (II) a propargyllic ether of the structure:

$$R'-C\equiv C-CH_2-O-R$$

wherein R, R' and perhaloalkyl are defined as above, under autogenous pressure in the range of about 0° to 180° C. and thereafter recovering the 2-alkoxy-2,5-dihydrofuran from the reaction mixture.

3. 2-methoxy-5,5-bis(chlorodifluoromethyl)-2,5-dihydrofuran.

References Cited by the Examiner

UNITED STATES PATENTS

| | | | |
|---|---|---|---|
| 2,967,890 | 1/61 | Mecorney et al. | 260—602 |
| 2,993,912 | 7/61 | Dunlop | 260—347.8 |
| 2,993,913 | 7/61 | Dunlop | 260—347.8 |
| 3,006,960 | 10/61 | Luten et al. | 260—602 |

IRVING MARCUS, *Primary Examiner.*

NICHOLAS S. RIZZO, WALTER A. MODANCE,
*Examiners.*

UNITED STATES PATENT OFFICE
CERTIFICATE OF CORRECTION

Patent No. 3,184,481                                       May 18, 1965

Horace R. Davis

It is hereby certified that error appears in the above numbered patent requiring correction and that the said Letters Patent should read as corrected below.

Column 1, line 11, for "intermediate" read -- intermediate --; column 2, line 1, for "esters" read -- ethers --; line 51, for "28.8%" read -- 28.2% --.

Signed and sealed this 12th day of October 1965.

(SEAL)
Attest:

ERNEST W. SWIDER
Attesting Officer

EDWARD J. BRENNER
                                                                                     Commissioner of Patents